(12) United States Patent
Hackel et al.

(10) Patent No.: US 6,198,069 B1
(45) Date of Patent: Mar. 6, 2001

(54) LASER BEAM TEMPORAL AND SPATIAL TAILORING FOR LASER SHOCK PROCESSING

(75) Inventors: Lloyd Hackel; C. Brent Dane, both of Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/133,590

(22) Filed: Aug. 13, 1998

(51) Int. Cl.⁷ .................. B23K 26/00; H01S 3/08
(52) U.S. Cl. .................. 219/121.6; 219/121.61; 219/121.74
(58) Field of Search .................. 219/121.6, 121.68, 219/121.69, 121.73, 121.74, 121.75, 121.85, 121.61; 359/300; 372/99

(56) References Cited

U.S. PATENT DOCUMENTS

| | | | |
|---|---|---|---|
| 4,734,911 | * | 3/1988 | Bruesselbach .................. 372/99 X |
| 5,103,073 | * | 4/1992 | Danilov et al. .................. 219/121.74 X |
| 5,127,019 | * | 6/1992 | Epstein et al. .................. 372/108 |
| 5,239,408 | * | 8/1993 | Hackel et al. .................. 359/338 |
| 5,880,873 | * | 3/1999 | Dane et al. .................. 359/300 |

FOREIGN PATENT DOCUMENTS

0085278 * 9/1983 (EP).

OTHER PUBLICATIONS

Dane, et al., "Laser Peening of Metals—Enabling Laser Technology," Lawrence Livermore National Laboratory Preprint UCRL–JC–129029, Nov. 1997.*

* cited by examiner

Primary Examiner—Samuel M. Heinrich
(74) Attorney, Agent, or Firm—John P. Wooldridge; Alan H. Thompson (57) ABSTRACT

Techniques are provided for formatting laser pulse spatial shape and for effectively and efficiently delivering the laser energy to a work surface in the laser shock process. An appropriately formatted pulse helps to eliminate breakdown and generate uniform shocks. The invention uses a high power laser technology capable of meeting the laser requirements for a high throughput process, that is, a laser which can treat many square centimeters of surface area per second. The shock process has a broad range of applications, especially in the aerospace industry, where treating parts to reduce or eliminate corrosion failure is very important. The invention may be used for treating metal components to improve strength and corrosion resistance. The invention has a broad range of applications for parts that are currently shot peened and/or require peening by means other than shot peening. Major applications for the invention are in the automotive and aerospace industries for components such as turbine blades, compressor components, gears, etc.

27 Claims, 9 Drawing Sheets

LASER BEAM TEMPORAL AND SPATIAL TAILORING FOR LASER SHOCK PROCESSING

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser shock processing, and more specifically, it relates to techniques for relaying the uniform intensity near-field of a laser beam to a work piece such that the intensity profile at the work piece remains uniform and is independent of the effects of phase aberrations and optical diffraction. The invention further relates to phase conjugation as a technique for pulse tailoring to enable the generation of high intensity shocks.

2. Description of Related Art

Using high power lasers to improve material properties is one of the most important industrial applications of lasers. Lasers can transmit controllable beams of high energy radiation for metalworking. Primarily, the laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high speed manufacturing. The fact that the beam can be controlled allows parts having complex shapes to be processed. Also accuracy, consistency, and repeatability are inherent to the system.

Improving the strength of metals by cold working undoubtedly was discovered early in civilization, as ancient man hammered out his weapons and tools. Since the 1950s shot peening has been used as a means to improve the fatigue properties of metals. Another method of shock processing involves the use of high explosive materials in contact with the metal surface.

The use of high intensity laser outputs for the generation of mechanical shock waves to treat the surfaces of metals has been well known since the 1970s. The laser shock process can be used to generate compressive stresses in the metal surfaces adding strength and resistance to corrosive failure.

Lasers with pulse outputs of 20 to 100 J and pulse durations of 20 to 100 ns are useful for generating inertially confined plasmas on the surfaces of metals. These plasmas create pressures in the range of 10,000 to 100,000 atmospheres and the resulting shocks pressure can exceed the elastic limit of the metal and thus compressively stress a surface layer as deep or deeper than 1 mm in the metals. Lasers are now becoming available with average power output meaningful for use of the technique at a rate appropriate for industrial production.

In the process of laser shock processing, a metal surface to be treated is painted or otherwise made "black." The black layer acts as an absorber of the laser energy and protects the surface of the part from laser ablation and from melting due to the high temperature of the plasma. A thin layer of water, typically 1 to 2 mm, is flowed over this black surface. The water acts to inertially confine or, as it is called, tamp the plasma generated as the laser energy is absorbed in the short time pulse duration, typically 30 ns. Other suitable materials which act as a tamper are also possible. A limitation to the usefulness of the process is the ability to deliver the laser energy to the metal surface in a spatially uniform beam. If not uniform, the highest intensity area of the light can cause a breakdown in the water which blocks delivery of meaningful energy to the painted metal surface. A conventional technique to deliver bring the laser light to the surface is to use a simple lens to condense the laser output to a power density of roughly 100 J to 200 J per square centimeter. This condensing technique has the limitation that a true "image" of the laser near-field intensity profile is not obtained at the surface. Rather a field intensity representing something between the near and far fields is generated. Diffraction of the laser beam as it is focused down onto the surface results in very strong spatial modulation and hot spots.

Any phase aberrations generated within the beam, especially those associated with operation of the laser for high average power, can propagate to generate higher intensity areas within the beam. These high peak intensity regions cause breakdown in the water layer, preventing efficient delivery of the laser energy to the surface to be treated. Another potential cause of breakdown in the tamping material is the generation of non-linear effects such as optical breakdown and stimulated scattering. In a normal generation of a 10 ns to 100 ns pulse within a laser, the output slowly builds over a time period exceeding several pulsewidths. This slow, weak intensity helps to seed the non-linear processes which require buildup times of 10 s of nanoseconds. In conventional techniques, the pulse output of the laser is "sliced" by an external means such as a fast rising electro-optical switch or by an exploding foil. These techniques can be expensive and can limit reliability.

SUMMARY OF THE INVENTION

It is an object of the present invention to provide improved techniques for laser shock processing.

A second object of this invention is the control of the stress generating process.

A third object of this invention is to provide pulse tailoring techniques for laser shock processing.

Another object of the invention is to relay an appropriately scaled image of the near field of the laser to the processing surface.

An object of the invention is to use a diffractive optic to tailor the phase of the near field of the beam and with a simple focusing lens (or lenses) generate a spot with tailored spatial shape and intensity profile suitable for specific applications of laser peening.

The invention is a method for formatting the laser spatial shape and for effectively and efficiently delivering the energy to a work surface in the laser shock process. An appropriately formatted pulse helps to eliminate breakdown and generate uniform shocks. The invention uses a high power laser technology capable of meeting the laser requirements for a high throughput process, that is, a laser which can treat many square centimeters of surface area per second. The shock process has a broad range of applications, especially in the aerospace industry, where treating parts to reduce or eliminate corrosion failure is very important. The invention may be used for treating metal components to improve strength and corrosion resistance. The invention has a broad range of applications for parts that are currently shot peened and/or require peening by means other than shot peening. Major applications for the invention are in the automotive and aerospace industries for components such as turbine blades, compressor components, gears, etc.

DETAILED DESCRIPTION OF THE INVENTION

An embodiment of the invention includes an optical system that relays an appropriately scaled image of the near field of the laser to the processing surface. In the near-field, phase aberrations remain as a phase component of the laser beam, not affecting the beam intensity profile. By relaying an image of the uniform intensity near-field of the laser beam to the work piece, the intensity profile at the work piece will remain uniform, independent of the effects of phase aberrations and optical diffraction. Since the high intensity of the laser would easily breakdown the air, it is necessary that the imaging occur without creating an intermediate focus between the focusing lens and the workpiece, such as would be the case for a simple Galilean telescope. This is accomplished with a three lens imaging system. The near field output of the laser is first dispersed by a negative lens, creating a virtual source farther from the work piece that the original near field. A pair of appropriately sized and spaced positive lenses collects the light from this virtual source and images it to the desired size on the work piece providing energies in the range of 100 to 250 J/cm². Because the optical system generates a real image on the target, aberrations of the laser phase, associated with production rate operation will not change the near field profile in the image plane on target. In the case where a laser generates an output with a highly uniform phase front, a diffractive grating can be used followed by a single focusing lens to generate a spot tailored in spatial profile and intensity distribution.

In particular, to generate a deep compressive stress, the laser process can generate such an intense shock that the material at the surface plastically deforms and liquefies resulting in a surface tensile layer after resolidification of the metal surface layer. This problem can be solved by applying a second laser shock of lower energy and hence lesser intensity. The fine control of the laser energy and the ability to double pulse first a hard and then a softer pulse enables this treatment.

Figure 1A:
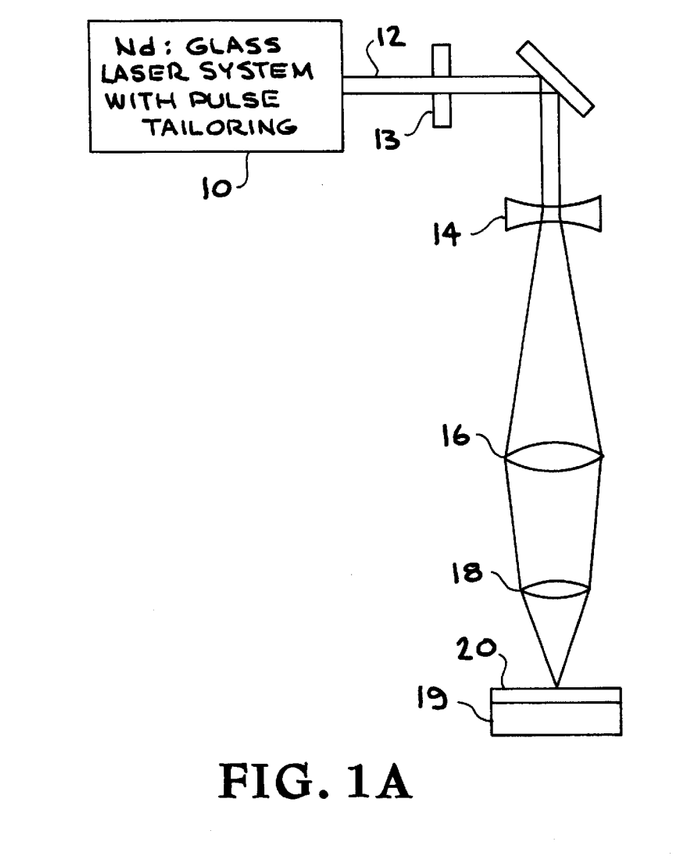
FIG. 1A shows an embodiment of the laser shock processing system of the present invention using a three lens system to allow relay of the object plane to the image plane without the need for a focus between the primary focusing lens and the work piece.

By combining the technology of an advanced laser system (including special techniques and hardware for pulse shape tailoring within the laser), a beam delivery system and specific pulse formats, superior results are achieved in laser shock processing. A basic system is shown in FIG. 1A. A laser system 10, with means for pulse tailoring, examples of which are described below, provides a laser beam 12. An aperture 13 is shown. Laser system 10 may be a Nd:glass laser system with an internal phase conjugator for wavefront control, prepulse suppression and pulse rise control. In the embodiment of FIG. 1A, a negative lens 14 disperses the laser beam 12, creating a virtual source farther from the work piece than the original near field. A pair of positive lenses 16, 18 collect the light from the virtual source produced by negative lens 12 and images this virtual source to the desired size on the work piece 19. This three lens system allows an image to be relayed from the object plane to the image plane without going through a focus. A tamping material 20 is placed on the work piece 19.

Figure 1B:
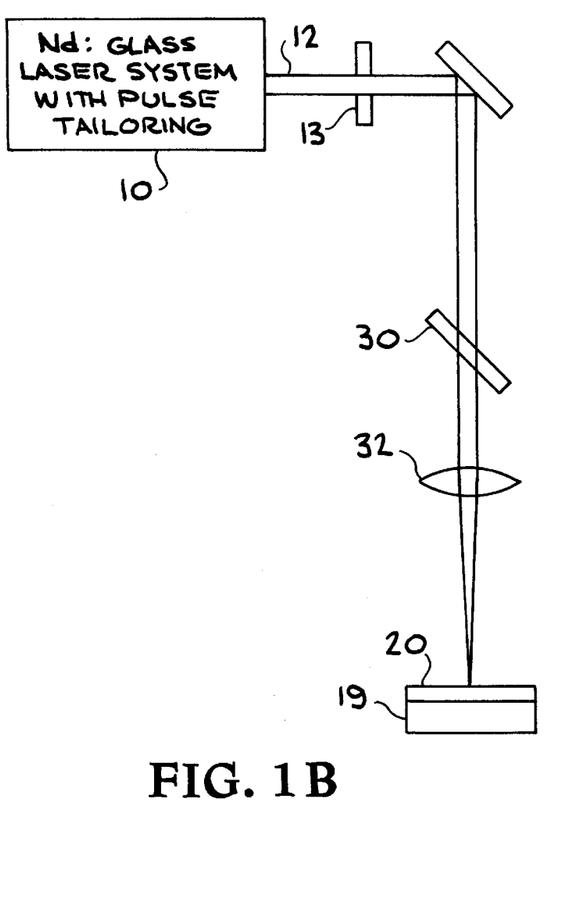
FIG. 1B shows an embodiment of the laser shock processing system of the present invention using a diffractive optic (in transmission) and lens setup for tailoring spatial shape and or intensity profile.
Figure 1C:
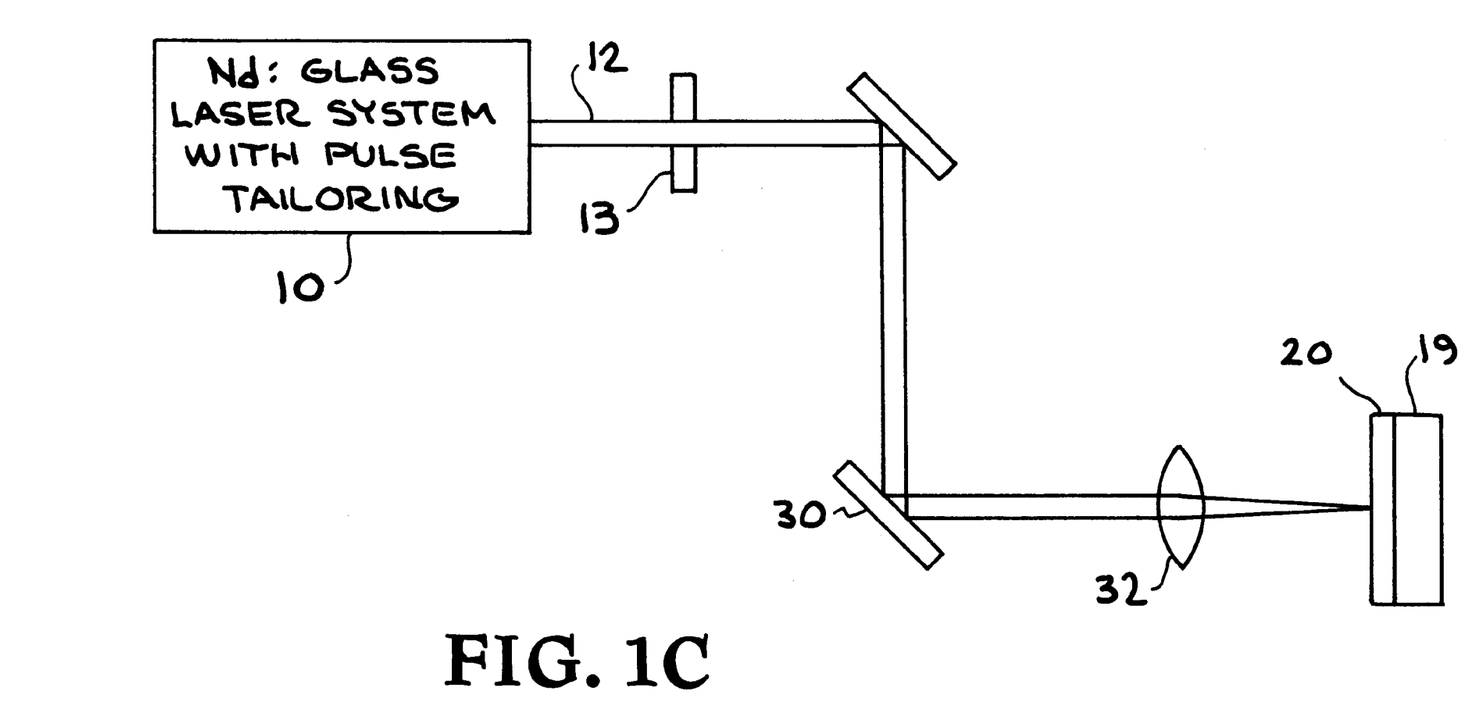
FIG. 1C shows an embodiment of the laser shock processing system of the present invention using a diffractive optic (in reflection) and lens setup for tailoring spatial shape and or intensity profile.
Figure 2:
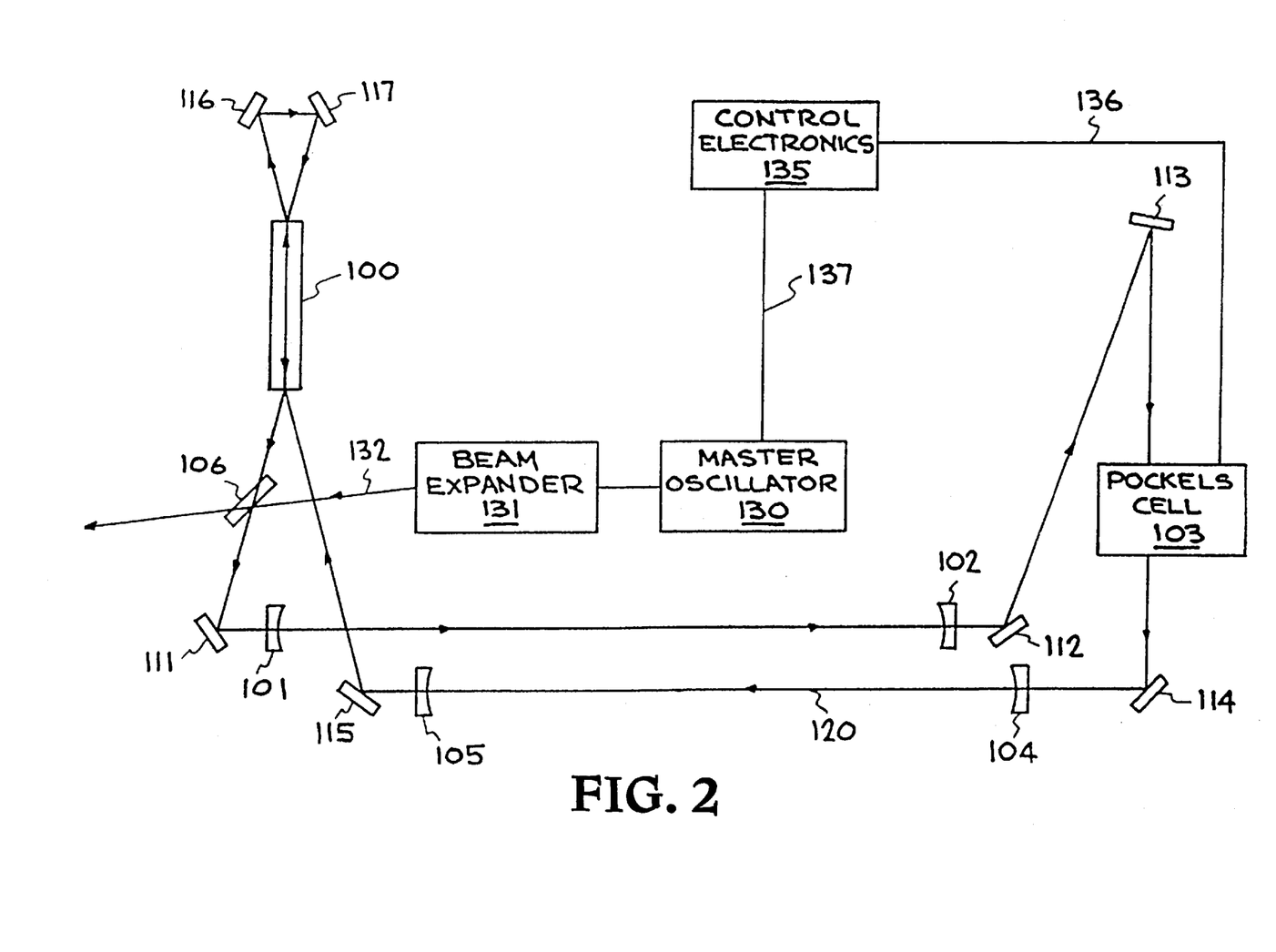
FIG. 2 shows an embodiment of the laser system of the present invention.
Figure 3:
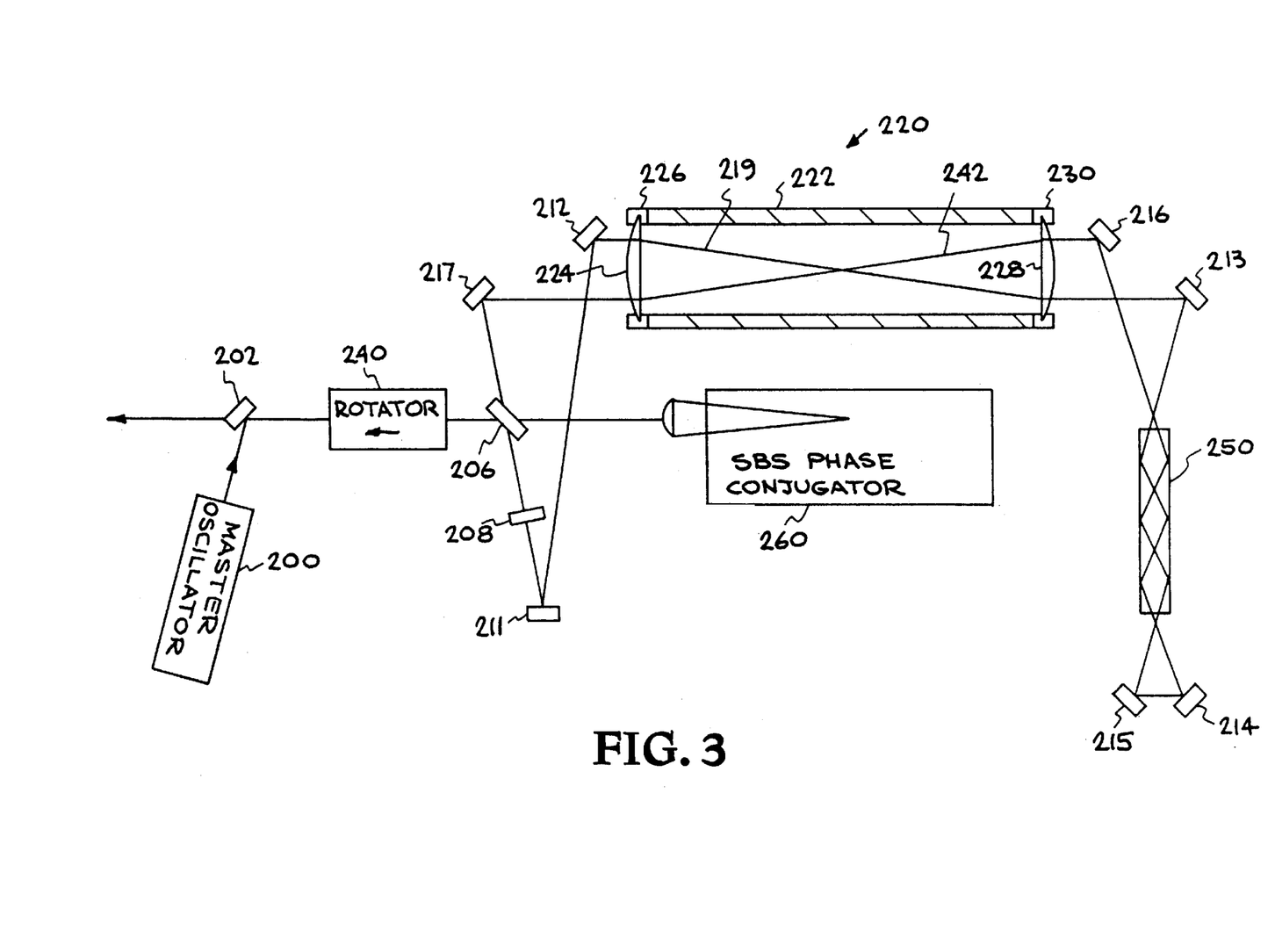
FIG. 3 shows another embodiment of the laser system of the present invention.
Figure 4:
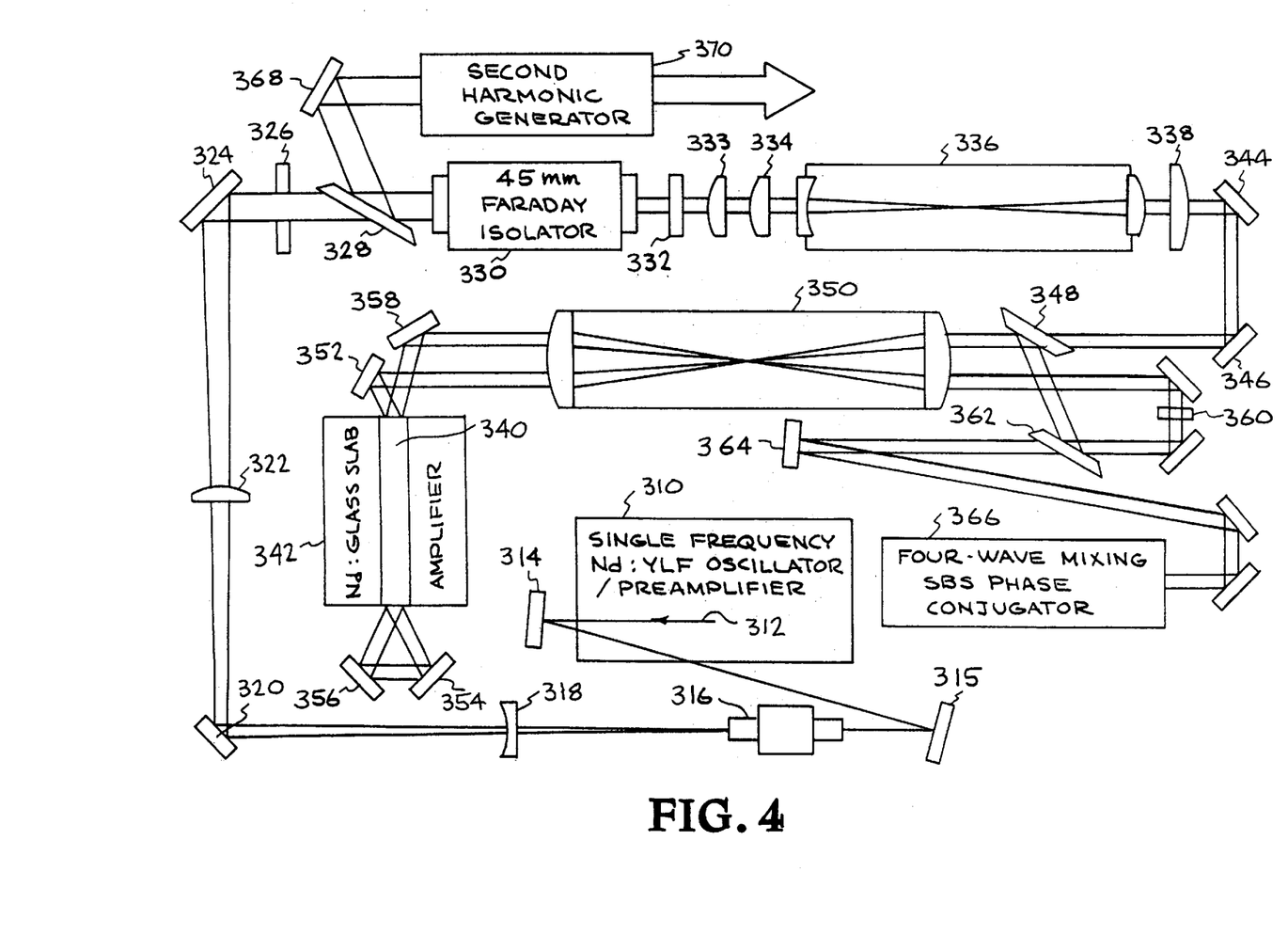
FIG. 4 shows another embodiment of the laser system of the present invention.

In the embodiment of FIG. 1B, a laser generates an output with a highly uniform phase front (such as in a phase conjugated laser of a single frequency, embodiments of which are disclosed in FIGS. 2–4). A transmitting diffractive grating 30 is placed in the output beam 12. FIG. 1C shows an embodiment utilizing a reflecting diffraction grating. In the embodiments shown in FIGS. 1B and 1C, the grating 30 is followed by a single focusing lens 32 to generate a spot tailored in spatial profile and intensity distribution. In practice, the lens 32 may precede the grating 30. To understand how the grating and lens combination works, one needs to first recognize that a lens generates at its far field focus, the Fourier transform of the near field phase front. With this in mind, one constructs a grating that varies the optical path for the transmitted beam in a defined and repeated pattern across the beam spatial profile. By designing this optical path difference pattern of the grating to be the Fourier transform of a desired intensity at the target and by placing a lens in the beam path (the lens can actually go either before or after the grating) the intensity profile in the far field (that is at the focus of the lens) takes on the shape, size and intensity distribution determined by the grating pattern, essentially independent of the beams original shape and intensity distribution. This technique allows precisely shaping and contouring of the beam to fit specific applications of the peening process, including but not limited to treating curved surfaces with specially profiled intensities. In production processing, changing the beam shape simply requires changing the grating to the new desired format leaving all other components in the system fixed. It should be pointed out that this process absolutely requires a highly uniform wavefront (that is near the diffraction limit) at the grating, the type of wavefront provided by the phase conjugated laser design discussed herein. This tailoring can allow uniform illumination of the workpiece—such as single curved concave or convex surfaces. The technique can also be used to create geometry patterns to match a required peening footprint—for example an elliptical spatial shape to match a needed spotsize or an arch shaped intensity profile to provide uniform loading to a curved surface.

Laser technology usable in the present invention is described in U.S. Pat. No. 5,285,310 titled "High Power Regenerative Laser Amplifier," incorporated herein by reference, and U.S. Pat. No. 5,239,408 titled "High Power, High Beam Quality Regenerative Amplifier," also incorporated herein by reference. Embodiments of laser systems usable in the present invention are described in U.S. Pat. No. 5,689,363 titled "Long Pulse Width, Narrow-Bandwidth Solid State Laser" incorporated herein by reference.

An important aspect for generating an intense shock is to prevent premature initiation of a weak but long duration "preshock" which can initiate incorrect plasma conditions. This "preshock" can also initiate conditions which generate breakdown and stimulated scattering in the tamping material. Previous researchers have empirically realized that a fast rising ($\geq 1$ ns) pulse performs better than a slowly rising pulse. It appears that they did not understand the full role played by suppression of prepulse laser energy arriving ahead of the laser pulse (prepulse) combined with generation of a fast rising pulse edge in preventing these unwanted effects. This invention uniquely achieves complete suppression of prepulse and produces a fast rise time by means of the stimulated Brillouin scattering phase conjugator placed within an embodiment of a Nd:glass laser. The thresholding characteristics of the device ensure the elimination of a prepulse and the rapid response associated with the acoustic buildup time make this phase conjugator an easy and reliable method for tailoring the early portion of the pulse.

In one embodiment, laser head 10 comprises a laser amplifier having a gain medium and source of pump energy coupled with the gain medium; a polarization rotator, such as a Pockels cell, which rotates an incident beam in response to assertion of a control signal; an optical relay system which relays a first image plane near the gain medium to a second image plane near the rotator, and which relays the second image plane back near the gain medium; and a plurality of reflectors configured to define an optical path through the gain medium, optical relay system and rotator, such that each transit of the optical path includes at least one pass through the gain medium and only one pass through the rotator. Input means, and output means are provided, which may be implemented as a single polarizer, for coupling an input pulse into the optical path, and coupling an amplified pulse having a predetermined polarization out of the optical path. A control circuit is provided which is coupled to the rotator, for generating the control signal in timed relationship with the input pulse so that the input pulse is captured by the input means and it proceeds through at least one transit of the optical path, and then the pulse is rotated to the predetermined polarization, after which the captured pulse passes through the gain medium at least once more and is coupled out of the optical path by the output means before passing through the rotator again, to provide an amplified pulse. Various embodiments of this laser system are described in U.S. Pat. No. 5,285,310, which is incorporated herein by reference.

FIG. 2 illustrates one layout of the amplifier system according to the present invention. As can be seen, the amplifier includes a slab-shaped gain medium 100, a first relay telescope consisting of lenses 101 and 102, a Pockels cell 103, and a second relay telescope consisting of lenses 104 and 105. Also, a polarizer 106 is included for capturing an input pulse, and coupling an output pulse out of the optical path. Seven flat, high reflecting mirrors 111, 112, 113, 114, 115, 116, and 117 define an optical path, schematically represented by the line 120, through the slab 100, the relay telescope consisting of lenses 101 and 102, the relay telescope consisting of lenses 104 and 105, and Pockels cell 103. Optional path 120 also proceeds through the polarizer 106.

A master oscillator 130 and beam expander 131 supply an input pulse along path 132. The input pulse has S polarization and reflects off the back of polarizer 106. It proceeds around the optical path through mirror 111, relay telescope with mirrors 101, 102, mirrors 112 and 113 to the Pockels cell 103, where its polarization is rotated by 90° to the P polarization. It then proceeds along the optical path to mirror 114 through relay telescope mirrors 104, 105, off mirror 115 into the slab 100 where it is reflected by mirrors 116 and 117 back through the slab 100. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

Because it had been rotated at the Pockels cell 103 from the S polarization to the P polarization, the beam leaving the second pass of the slab 100 is transmitted by polarizer 106 through the ring. As long as the polarization of the pulse remains in the P polarization, it will be captured in the ring for a plurality of transits. In one system, it will transit the ring at least one more time, for third and fourth passes through the slab 100. In the next transit of the ring, the Pockels cell controlled by control electronics 135 switches the polarization from the P polarization to the S polarization. In the S polarization, the beam proceeds off of mirror 114 through telescope mirrors 104, 105, and off of mirror 115 for fifth and sixth passes through the slab 100. As it exits the slab 100, the pulse is reflected by the polarizer 106 as a high energy output pulse.

The characteristics of this amplifier configuration include the use of a single polarizer 106 within the optical path, a first telescope with lenses 101 and 102 relays an image of the input aperture located near the slab 100 to a location near the Pockels cell 103, and a second telescope with lenses 104 and 105 relays the image near the Pockels cell 103 back to near the slab 100. In this way, the slab 100 and polarizer 106 are near a first relay plane, and the Pockels cell 103 is near a second relay plane which have a relatively smooth distribution of power with minimal phase and amplitude perturbation. In addition, the pulse does not proceed through the Pockels cell or relay telescopes after the final two passes through the slab 100. This minimizes the average power seen by the Pockels cell 103 and relay telescope lenses 101, 102, 104 and 105, and minimizes the risk that perturbations in the pulse will exceed the peak power thresholds of the Pockels cell or the telescopes lenses.

Thus, the amplifier illustrated in FIG. 2 exhibits low loss, with two slab passes per ring transit, and immediate output coupling of the high power beam before it passes through other lossy optical elements. It also exhibits a very high extraction efficiency because of multiple passes through the ring. This amplifier design has high optical tolerance because all optical components in the optical path are placed near images of the input aperture, minimizing the likelihood of high peak perturbations in the beam. Finally, a low Pockels cell power load is achieved because the polarization is switched before the final two slab passes during which one half to two thirds of the power is extracted from the slab.

The rotator is used to control the beam polarization to trap the beam within the ring by rotating it to a polarization transmitted by the polarizer, and then at an appropriate time couple it out by rotating the polarization to the predetermined polarization reflected by the polarizer. Thus, to extract a high power beam in the configuration of the present invention, the Pockels cell is controlled to rotate the beam from P to S polarization prior to the last two passes of the gain medium. In this configuration, the gain medium amplifies P polarization on initial passes through the ring, and amplifies S polarization on the last two passes. Immediately upon leaving the gain medium after the last two passes, the beam of S polarization is coupled out by the output polarizer. In a regenerative amplifier, such as that described according to the present invention, one half to two thirds of the power is extracted in the last two passes. Thus, this design results in a minimal number of optical components in the optical path being exposed to the highest power laser energy.

In another aspect of the invention, there are at least two passes through the gain medium for each transit of the optical path. Furthermore, the gain medium includes first and second faces transverse to the optical path which permit transmission of light substantially independent of the polarization. This configuration allows for near unity fill of the gain medium, and thus, efficient extraction. In addition, the double pass significantly improves the gain to loss ratio of the ring, further improving the efficiency.

The amplifier configuration of this embodiment of the present invention involves, in effect, two relay telescopes. This allows the Pockels cell to be spaced a significant distance from the gain medium, but allows placement of all of the optical elements in the system near an image plane to minimize intensity spiking caused by diffraction and phase perturbations in the beam.

Yet another aspect of the invention arises in the placement of the Pockels cell, relay system, and output polarizer relative to the gain medium. In particular, the output polarizer is placed between the gain medium and the relay system so that the Pockels cell and the relay system are never loaded with the energy of the final two beam passes through the gain medium.

Other embodiments of laser head 10 are described in U.S. Pat. No. 5,239,408, which is incorporated herein by reference. In this embodiment, laser head 10 comprises an amplifier system which includes a ring shaped optical path with a limited number of components. The optical path includes an internal polarizer, a passive 90 degree phase polarization rotator, a plurality of mirrors, a relay telescope, and a slab shaped gain medium. For inputting and outputting a pulse, the amplifier further includes a master oscillator, an external polarizer, and a one-way isolation rotator. The amplifier further includes a phase conjugator to enable reduction of phase aberrations.

In operation, a signal is input into the system at the external polarizer by a master oscillator which generates a beam with a polarization causing the beam to reflect off of the external polarizer. The beam will then proceed from the external polarizer through the isolation rotator, with no polarization change to enter the ring through the internal polarizer.

The pulse input into the ring shaped optical path is reflected by the internal polarizer and proceeds through a passive 90 degree phase polarization rotator where polarization is rotated. The pulse then proceeds from the 90 degree phase rotator through first and second mirrors to a relay telescope. From the telescope, the beam proceeds through a third mirror into a gain medium, or slab where it is reflected by fourth and fifth mirrors back through the slab. From the slab, the beam is reflected off a sixth mirror back through the telescope and off a seventh mirror where it is reflected into the internal polarizer, thus completing one path around the ring.

The beam, now having a polarization to pass through the internal polarizer, will proceed for a second pass through the ring as described above. In the second pass, polarization rotation by the 90 degree rotator causes the beam to reflect off the internal polarizer into a stimulated Brillouin scattering (SBS) phase conjugator. The beam proceeding back out of the phase conjugator will also be reflected by the internal polarizer to proceed around the ring twice in the opposite direction. The threshold characteristics of the SBS phase conjugation process prevent reflections of low intensity portions of the beam from clipping off and thus eliminating the amplified output of prepulses and the low intensity early portion of an output pulse. The response time of the SBS medium (often referred to at the $T_2$ time) determines the rate at which the conjugator reflectivity rapidly changes from a near zero value to its full value (typically 85%). By choosing an appropriate phase conjugation medium, such at $CCl_4$ or a freon, risetimes of less than 1 ns can be achieved. In this way, due to its thresholding and fast rise characteristics, the phase conjugator protects the amplifier from unwanted amplification prior to injection of the pulse, blocks prepulses and weak early portions of the pulse and creates an output pulse with rapid rising output.

After two passes around the ring in the opposite direction, polarization rotation by the 90 degree rotator causes the beam to reflect off of the internal polarizer out of the ring into the isolation rotator, e.g., Pockels cell. The isolation rotator rotates the polarization of the outgoing beam so that the beam will be output by the external polarizer.

The components of the present invention and their configuration as described above achieve reduced intensity spiking from diffraction and phase perturbations by first utilizing two paths around a ring shaped optical path before entering the SBS phase conjugator and two equal paths around the ring in the opposite direction but with reversed phase after exiting the SBS phase conjugator. The phase reversal and subsequent propagation through the amplifier results in essentially zero net phase aberration in the output beam.

Further, the Pockels cell is removed from the ring and replaced by a passive phase shifter so that no switching in the ring is required. A typical Pockels cell has approximately fourteen surfaces and will create more diffraction or phase perturbations than a two surface passive phase shifter. Also, with a passive phase shifter in the ring, the length of an input pulse may be as long as four times the distance of one transit of the ring. Also, with a passive phase shifter in the ring and a Faraday rotator replacing the input/output Pockels cell, no active switching is required and any length pulse can be amplified.

Another advantage of the amplifier configuration of the present invention is the placement of components near the telescope which involves, in effect, two relay telescopes. Use of the telescope of the present invention reduces diffraction caused by the significant distances between mirrors in the telescope of FIG. 1. Also, there are at least two passes through the slab for each transit of the optical path improving the gain to loss ratio of the ring.

Because of the combination of passive rotator and reflection (here by the phase conjugator) no Pockels cell switch is needed inside the ring. The configuration of components in the system allows the Pockels cell outside the ring to be an isolation Pockels cell which changes the beam phase as the beam passes through the Pockels cell in the direction only. Also, a passive Faraday rotator can be used.

FIG. 3 is a schematic diagram of the regenerative laser amplifier according to the present invention. The amplifier of FIG. 3, includes a master oscillator 200, a rotator 240, such as a Pockels cell or Faraday rotator, a relay telescope 220, a slab-shaped gain medium 250, and an SBS phase conjugator 260. The slab 250 is enclosed in a pump cavity (not shown). Two polarizers 202 and 206 are also included for capturing an input pulse, and extracting an output pulse. Seven flat, highly reflecting mirrors 211, 212, 213, 214, 215, 216, and 217, define an optical path through the slab 250, and telescope 220, and polarizer 206 connects the ring to SBS phase conjugator 260.

In operation, a master oscillator 200 supplies an input pulse which has S polarization. The pulse reflects off polarizer 202, proceeds through an isolation Pockels cell 240 remaining unchanged in polarization, and is further reflected off polarizer 206 into a ring shaped optical path defined by mirrors 211–217. In the ring, the beam enters the 90 degree rotator 208 which rotates the beam by 90° to the P polarization. The pulse proceeds through mirrors 211 and 212 along optical path 219 through relay telescope 220. The telescope 220 includes a vacuum chamber 222 having a first lens 224 mounted by a vacuum tight seal 226, and a second lens 228 mounted by vacuum tight seal 230. In an illustrative embodiment, each of the lenses 224 and 228 is a 1.2 meter focal length lens. The spacing between lenses 224 and 228 is approximately 2.4 meters adjusted so that the lens pair is afocal.

From telescope 220, the beam proceeds through mirror 213 into and through the slab 250 where it is reflected by mirrors 214 and 215 back through the slab 250. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 250, the beam is reflected off mirror 216 along path 242 through telescope 220, off mirror 217 where it is reflected back into polarizer 206. Since the beam has been rotated by the 90 degree rotator 206 from the S polarization to the P polarization, the P polarized beam is transmitted by polarizer 206 to 90 degree rotator 208 to proceed through the ring a second time. However, during this second pass through the ring, 90 degree rotator rotates the polarization by 90° back to the S polarization. Therefore, when the beam reaches the polarizer 206 at the end of a second pass through the ring, it will be reflected into SBS phase conjugator 260.

The beam proceeding back out of the SBS phase conjugator, trimmed of any prepulse and tailored with a fast rising edge, still having the S polarization, but reversed phase error will be reflected by polarizer 206 to mirror 217 where it will proceed along path 242 through telescope 220 to mirror 216. From mirror 216. From mirror 216, the beam will proceed through slab 250 a first time and be reflected back through the slab 250 a second time by mirrors 214 and 215. Proceeding out of slab 250, the beam will be reflected off mirror 213 and proceed back through telescope 220 and mirrors 212 and 211 to 90 degree rotator 208. The 90 degree rotator 208 will rotate the polarization by 90° back to the P polarization and transmit the beam to polarizer 206, thus completing a third pass through the ring, but this time in the reverse direction from the first two passes.

Since the beam has a P polarization, the beam will pass through polarizer 206 and proceed through the ring for a fourth pass through the ring, or a second pass in the reverse direction. At the end of this fourth pass through the ring, 90 degree rotator will rotate the polarization back to the S polarization causing the beam to reflect off of polarizer 206 out of the ring and into isolation Pockels cell 240. By this point, the net accumulated phase error is essentially zero. Isolation Pockels cell 240 or Faraday rotator will rotate the polarization of the beam to the P polarization enabling the beam to pass through polarizer 202 as a high energy output pulse.

Thus, the amplifier illustrated in FIG. 3 exhibits reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive phase shifter instead of a Pockels cell. Additionally, all optical components are placed near the image planes by the use of two relay telescopes. The amplifier also exhibits higher gain to loss, with two slab passes per ring transit.

Other embodiments of laser head 10 are described in U.S. Pat. No. 5,689,363, entitled Long-Pulse-Width Narrow Bandwidth Solid State Laser, which is incorporated herein by reference. According to an embodiment disclosed therein, laser head 10 comprises a long pulse laser system that emits 500–1000 ns quasi-rectangular pulses at 527 nm with near diffraction-limited divergence and near transform-limited bandwidth. The system consists of one or more flashlamp-pumped Nd:glass zig-zag amplifiers, a very low threshold SBS phase conjugator system, and a free-running single frequency Nd:YLF master oscillator. Completely passive polarization switching provides eight amplifier gain passes. Multiple frequency output can be generated by using SBS cells having different pressures of a gaseous SBS medium or different SBS materials. This laser system produces a long pulse, low divergence, narrow-bandwidth, multi-frequency output. Because of its high average power and high beam quality, this system has application in any process which would requires a long pulse format, including the material processing application of the present invention.

FIG. 4 is a schematic diagram of an embodiment of a high energy narrow-bandwidth, solid state laser system 10 according to the present invention. The figure shows an oscillator/preamplifier 310 comprising, e.g., a single frequency Nd:YLF laser oscillator or preamplifier. Oscillator/ preamplifier 310 produces single frequency laser beam 312. In the Nd:YLF embodiment, beam 312 has a wavelength of 1054 nm, at 240 ns FWHM and typically 60 mJ of power. Upon exiting oscillator/preamplifier 310, beam 312 is polarized horizontally, i.e., parallel to the plane of the paper of FIG. 4. Beam 312 maintains this polarization as it reflects from turning mirror 314, passes through Faraday isolator 316 and negative lens 318, reflects from mirror 320, passes through positive collimating lens 322, reflects from mirror 324 and is masked by input mask 326. Polarizing beamsplitter 328 is oriented to transmit P-polarization, and thus, transmits horizontally polarized beam 312.

The directions of rotation of 45° Faraday isolator 330 and 450 quartz rotator 332 cancel each other in the input direction such that the beam which exits remains horizontally polarized. Beam conditioning optics 333 and 334, anamorphic relay telescope 336 and collimating lens 338 prepare the beam size to fit the required aperture 340 of amplifier 342. Beam 312 reflects from mirrors 344 and 346 and transmits through polarizing beamsplitter 348 which is configured to transmit P-polarization and reflect S-polarization. The transmitter beam is relayed by 1:1 relay telescope 350 to a two-pass optical axis comprising mirrors 352, 354, 356 and 358. The amplifier 342 is place on axis with this two-pass optical axis. After passing through relay telescope 350 again, the polarization of beam 312 is rotated 90° by quartz rotator 360 to the vertical plane, i.e., perpendicular with respect to the plane of the paper. Beam 312 is then reflected by polarizing beamsplitter 362 to be re-injected into the amplification system by polarizing beamsplitter 328.

After two more amplification passes, the polarization of beam 312 (FIG. 4) is again rotated 90° allowing transmission through beamsplitter 362, reflection from mirror 364 and entrance into Four-wave mixing SBS phase conjugator 366, which reverses the phase of beam 312. Upon reversal of direction, beam 312 undergoes 4 more amplification passes and exits the system at polarizing beamsplitter 328, which is configured to reflect S-polarization. Mirror 368 directs beam 312 through second harmonic generator 370.

The 45 degree Faraday and quartz rotator set result in a totally passively switched beam train. The beam enters the amplifier system from the oscillator through the anamorphic telescope which takes it from a square 25×25 mm size to the 8×120 mm required by the glass amplifier aperture. In this design, the output passes back through the same telescope, restoring the 25×25 mm square beam shape. The input beam enters the regenerative amplifier ring in p-polarization through a polarizing beamsplitter, and undergoes two gain passes. The polarization is then rotated 90 degrees by the quartz rotator and it now reflects from the same beamsplitter in s-polarization and undergoes two more gain passes. When the polarization is returned to the original Pp-state after the second pass through the rotator the beam is coupled out through a polarizing beamsplitter in the ring and directed into the SBS four-wave mixing conjugator. The reflected beam from the conjugator retraces the path of the input beam, resulting in four more gain passes for a total of eight. The polarization rotation of the 45 degree Faraday rotator and the 45 degree quartz rotator canceled each other in the input direction but now, in the output direction, they add resulting in a full 90 degree rotation, and the amplified beam is reflected off the first polarizing beamsplitter and enters the doubler.

Figure 5:
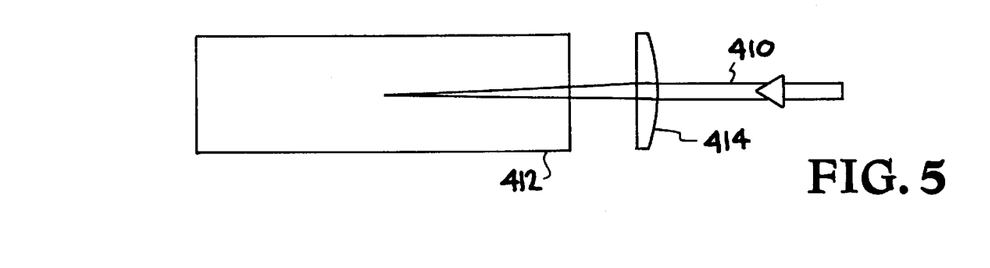
FIG. 5 shows a prior art SBS phase conjugate mirror having a liquid or gas medium.
Figure 6:
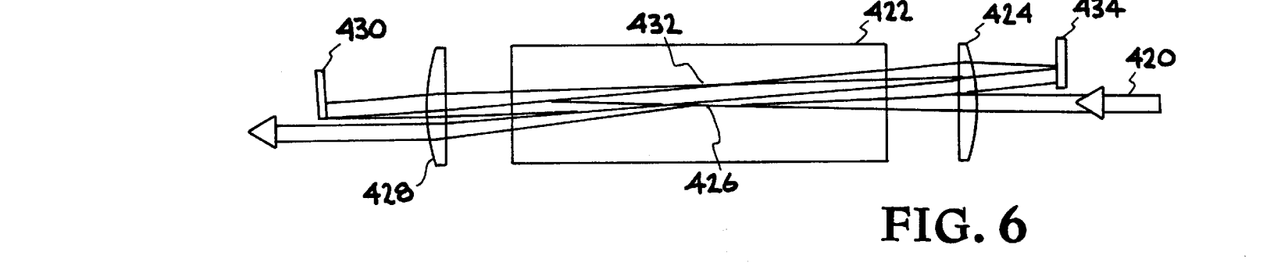
FIG. 6 shows a prior art 3 foci SBS loop geometry phase conjugate mirror having a liquid or gas SBS gain medium.

FIGS. 5 and 6 show optical configurations of solid-state SBS phase conjugate mirrors usable in the present invention. FIG. 5 shows a conventional configuration in which an incoming laser pulse 410 is simply focused into the SBS medium 412 with a single lens 414. FIG. 6 shows a configuration where two of three foci overlap to form a four-wave-mixing resonance. A laser beam 420 is focused into the SBS medium 422 with lens mirror 424. After passing through a focus at 426, diverging beam 420 is collimated by lens 428 and reflected by a high reflector (HR) 430 back into the SBS medium 426 and brought to a focus at 432 by lens 428. Lenses 424 and 428 together comprise a confocal lens pair. After passing through focus 432, beam 420 diverges and is collimated by lens 424. This collimated beam is reflected by high reflector 434 through lens 424, focus 426, and lens 428 to exit the system.

The optimal configuration of a multi-pass, multi-resonant optical architecture can completely eliminate temporal phase instability during the stimulated scattering process and thus prevent any damage to the solid state SBS medium. Since short focal length lenses can now be used, the result is a very compact and physically rugged phase conjugate mirror which requires no liquids or high pressure gasses.

A stimulated Brillouin scattering (SBS) phase conjugate laser mirror has been designed which uses a solid-state nonlinear gain medium instead of the conventional liquid or high pressure gas medium. The concept has been effectively demonstrated using common optical-grade fused silica. An energy threshold of 2.5 mJ and a slope efficiency of over 90% were achieved, resulting in an overall energy reflectivity of >80% for 15 ns, 1 $\mu$m laser pulses. This all solid state phase conjugator is safer, more reliable, and more easily manufactured than prior art designs. It allows nonlinear wavefront correction to be implemented in industrial and defense laser systems whose operating environments would preclude the introduction of potentially hazardous liquids or high pressure gases.

The present invention can use a doubly-resonant (5 foci) SBS loop geometry which completely eliminates temporal instabilities, resulting in an all solid-state SBS mirror design with high reflectivity and free of optical damage problems. The inventors have recognized that a multi-resonant design is possible that incorporates beams which overlap in two separate focal points inside the SBS medium. This allows the number of gain passes to be increased to an arbitrary number of passes (5, 7, 9, and so on), limited only by the clear aperture of the optical components and the SBS nonlinear medium.

Optionally, the threshold reduction and performance enhancement available from reflectivity of the SBS mirror can be further improved by focusing the light transmitted all the way through the mirror into a multi-mode fiber of the same material as the SBS loop nonlinear medium. The light gain guided in this fiber can "seed" the SBS in the resonant SBS loop. The loop will control the spatial characteristics. A variation to this improvement is to externally "seed" the initiation of SBS return by coupling a small fraction of the output from the originating laser beam first into a frequency shifting mechanism (a phase modulator or acousto-optic shifter) and then into a multi-mode fiber for transport to the back side of the SBS conjugator. The frequency shifting mechanism adds the appropriate Stokes frequency shift (700 MHz for fused silica) to the light so that it can function as an SBS seed. The delay time through the modulator and fiber length must be chosen (by appropriate length of fiber) such that the seed pulse arrives at the same time as the normal transmission through the SBS mirror.

The solid state SBS phase conjugator has wide application in ruggedized, MIL-spec, fielded lasers for DoD applications. By eliminating potentially dangerous high pressure gas cells or liquids that pose a threat to operators or the environment, this device facilitates the introduction of SBS phase conjugation into commercial and industrial high average power laser applications. The special handling requirements for liquids and gases are thus replaced by well developed optical fabrication methods for glass and crystalline materials.

Figure 7A:
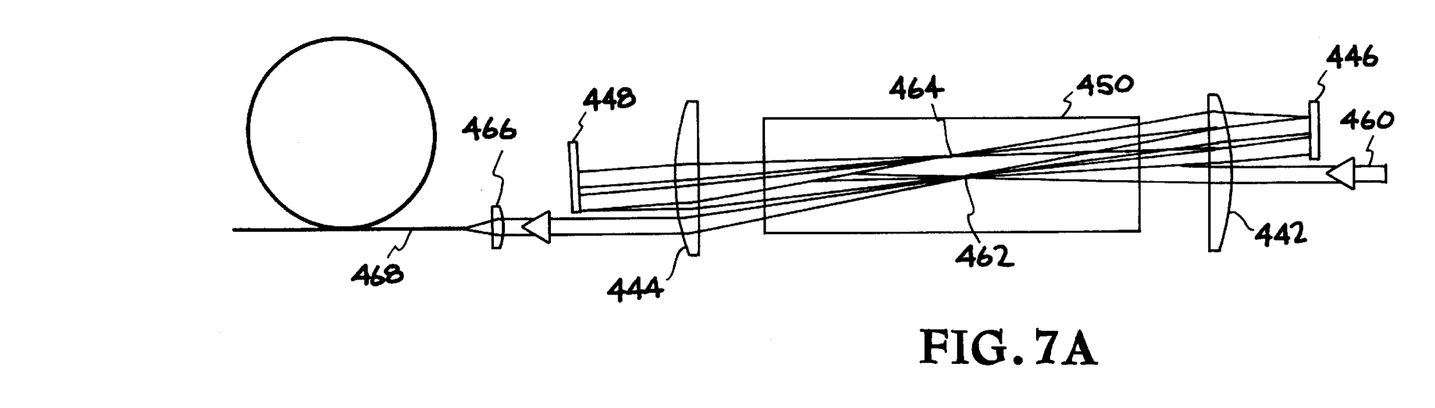
FIG. 7A shows the doubly resonant SBS loop geometry phase conjugate mirror of the present invention, incorporating a wave-guide fiber SBS oscillator to seed the Stokes generation.

A solid-state SBS conjugator usable in the present invention is illustrated in FIG. 7A. It has a doubly resonant configuration incorporating five foci distributed in two overlapping regions. The SBS conjugator includes lenses 442 and 444 (which together comprise a confocal lens pair), a pair of high reflectors 446 and 448, and the solid state SBS medium 450. In operation, an input laser pulse 460 is brought to a focus 462 by lens 442. The beam is then re-collimated by lens 444 and reflected from the surface of high reflector (HR) 448, at point 1, back through lens 444, focus 464 and lens 442 to be reflected from point 2 on HR 446. This reflected beam is focused by lens 442 through focus 462, to then propagate through lens 444 onto spot 3 of HR 448 and then to be reflected back into SBS medium 450 to be focused by lens 444 at point 464. The beam then is recollimated by lens 442 and reflected from HR 446 at spot 4 back into the SBS medium for one last pass through focus 462 before exiting the system through lens 444.

Figure 7B:
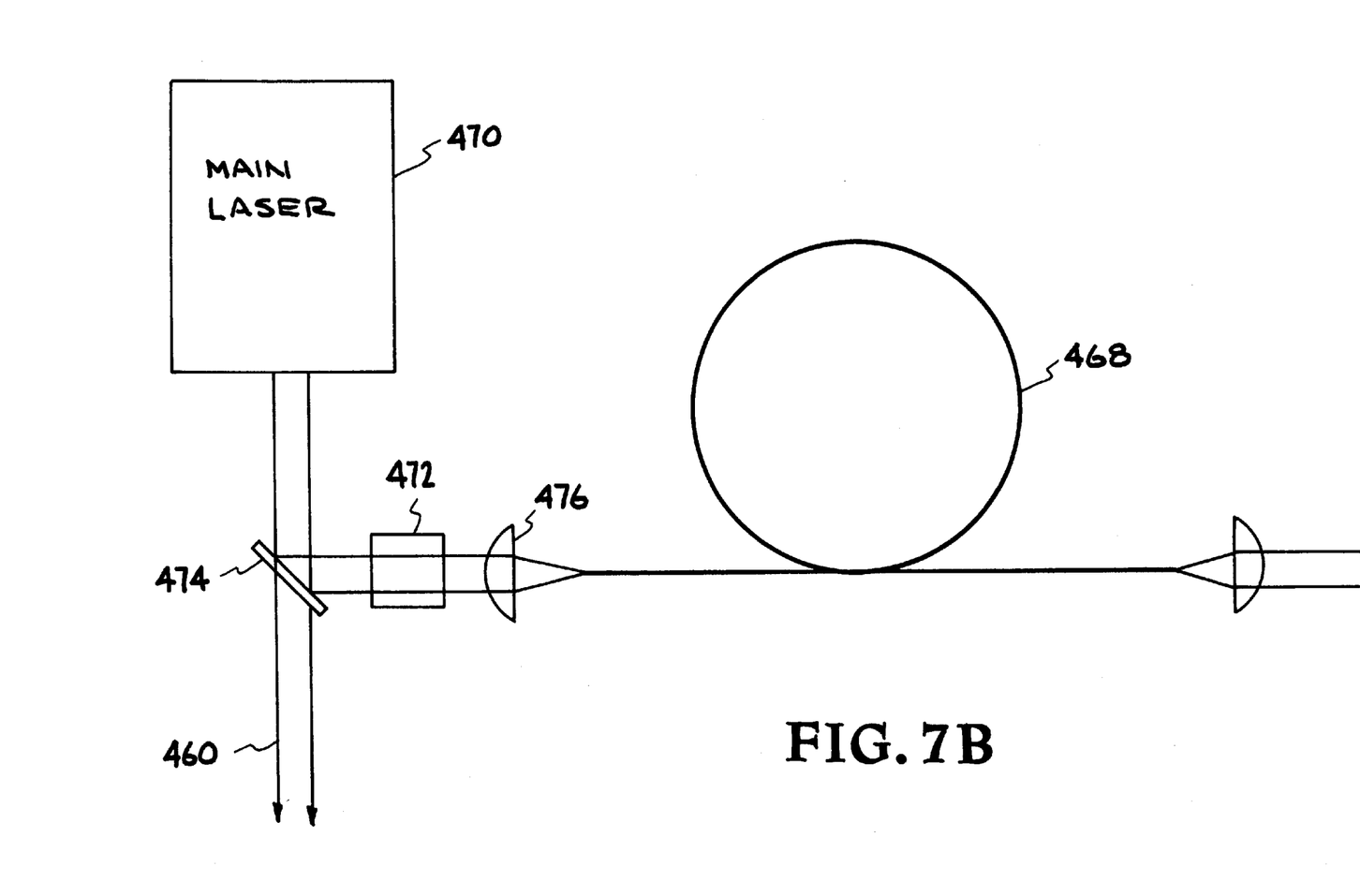
FIG. 7B shows the pump laser for the multi-mode fiber and the SBS mirror.

The reflectivity of the SBS phase conjugate mirror of FIG. 7A can be further increased by focusing (with lens 466) the light transmitted all the way through the mirror into a multi-mode fiber 468 of the same material as the SBS loop nonlinear medium 450. A very low threshold can be achieved due to the wave-guide properties of the fiber 468, although poor wavefront reversal (phase conjugation) performance is typically observed. In this case, however, the SBS return, which spontaneously is generated in the fiber from the fiber oscillator, serves simply to seed the light build-up in the SBS loop mirror, increasing overall stability and further reducing the nonlinear threshold. An even more definitive way to initiate a "seed" to initiate the SBS, as shown in FIG. 7B, is to couple a small fraction of the light from the originating laser system 470 through an appropriate frequency shifter 472 (phase modulator or acousto-optic shifter) and then, with e.g., a beamsplitter 474 and a lens 476, into a multi-mode fiber 468 who's output couples this light into the transmission side of the SBS phase conjugate mirror. The applied frequency shift is the same at the Stokes shift normally generated in the SBS process and allows this external light to seed a very well defined temporal start to the SBS process. This latter technique does not require the fiber to be made of the same material as the phase conjugator because the Stokes return is generated by the frequency shifter and not within the fiber. By appropriately tailoring the length of the fiber, the arrival time of the "seed" is made to match the start time of the normal SBS process. The seed pulse initiates a strong temporal start to the SBS process and the loop SBS geometry controls the spatial and hence wavefront content.

Referring to FIGS. 7A, 7B and 8A–C, the relative position of the reflected spots on the high reflectors 446 and 448 is indicated by the numbers adjacent to each mirror. The number coincides with the pass number of beam 460 through the SBS medium 450. The input pulse 460 propagates through the SBS medium to point 1, and continues to be reflected back and forth through the medium to successive points 2, 3 and 4. In FIGS. 7A and 4A, after reflecting from HR 446 at point 4, the beam passes once more through the SBS medium before exiting the system. The optical geometry described has 5 gain passes. However, by sliding reflector 448 to intercept the transmitted beam, additional passes which are added in pairs, result.

Figure 8A:
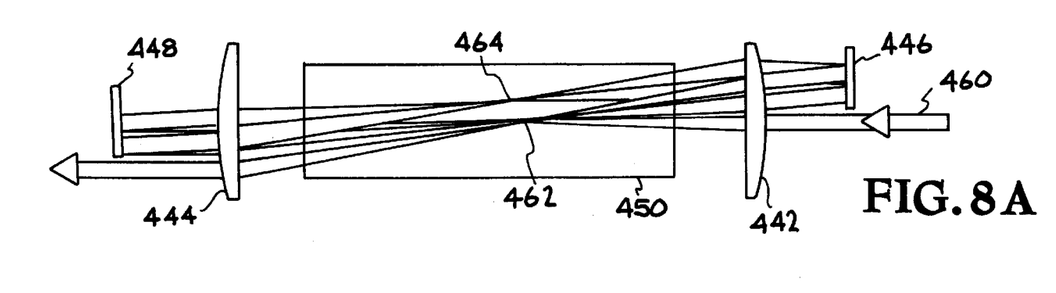
FIGS. 8A–C shows configurations made possible by the optical geometry of this invention which have 5, 7, and 9 passes through the SBS medium.
Figure 8B:
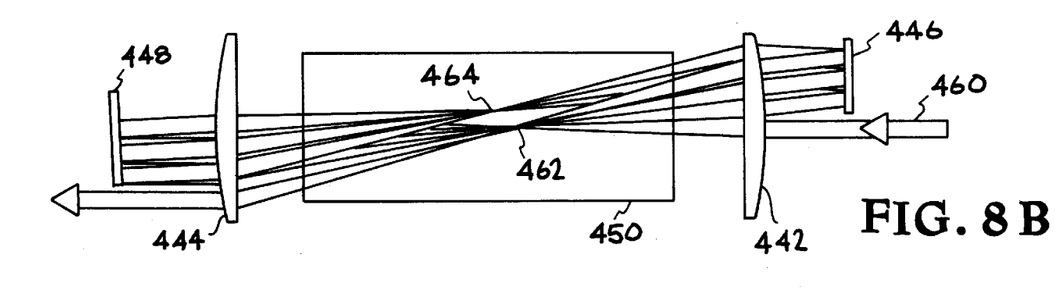
Figure 8C:
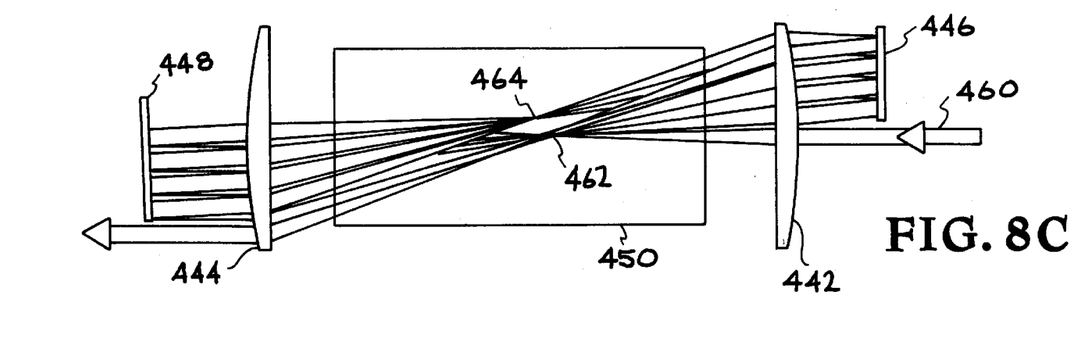

Referring to FIGS. 8B and 8C, each set of passes added by the translation of reflector 448 into the output beam are automatically aligned through foci 462 and 464. FIG. 8B shows a 7 pass doubly resonant SBS loop geometry. The input pulse 460 propagates through the SBS medium to point 1, and continues to be reflected back and forth through the medium to successive points 2 through 6. After reflecting from HR 446 at point 6, the beam passes once more through the SBS medium before exiting the system. FIG. 8C shows a 9 pass doubly resonant SBS loop geometry. The input pulse 460 propagates through the SBS medium to point 1, and continues to be reflected back and forth through the medium to successive points 2 through 8. After reflecting from HR 446 at point 8, the beam passes once more through the SBS medium before exiting the system. The SBS mirror can be configured to any odd number of gain passes greater than or equal to 3.

Figure 9:
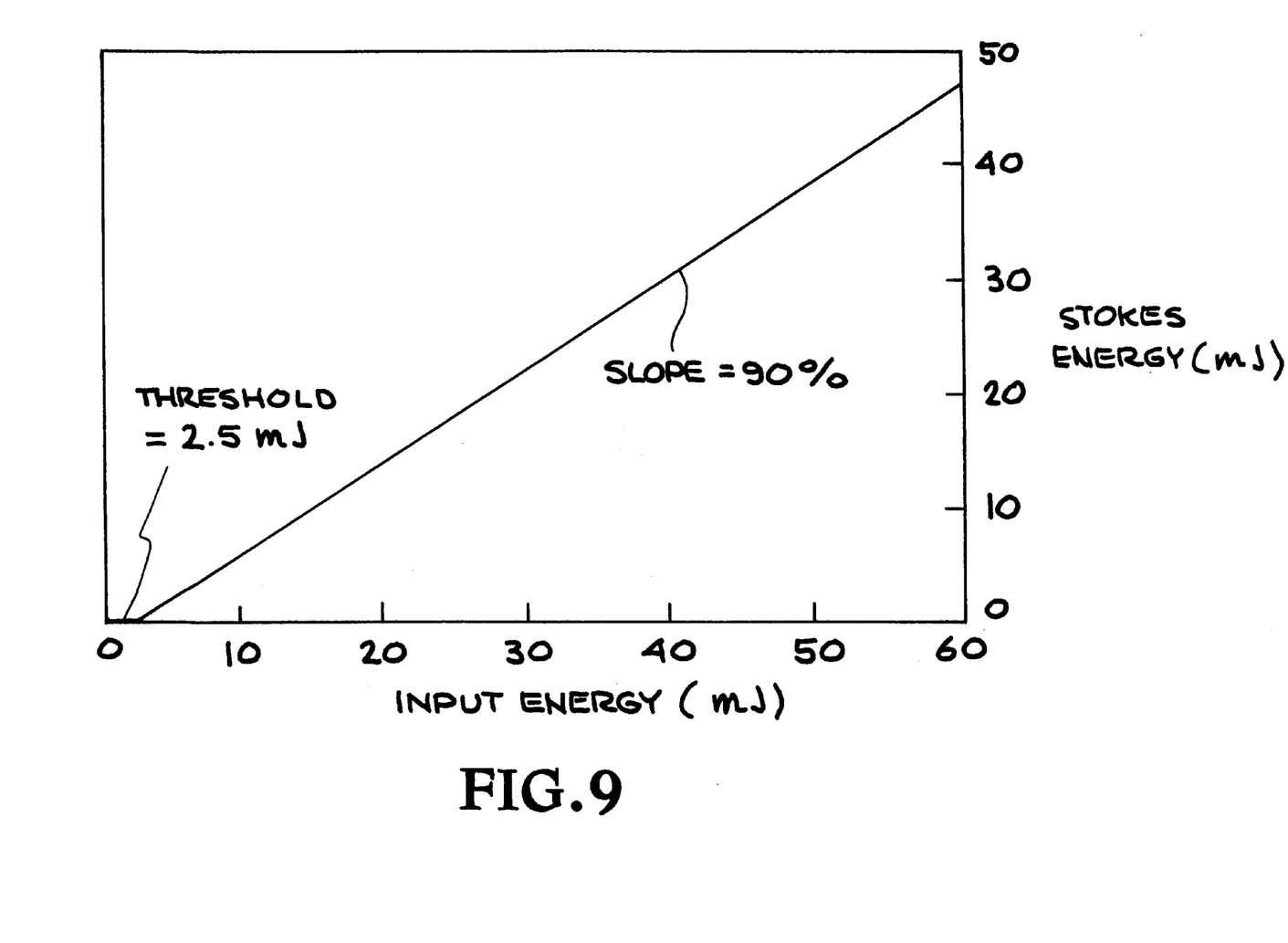
FIG. 9 shows a graph of SBS reflectivity measured in a fused silica SBS phase-conjugate mirror using the five-pass architecture of the present invention.

The SBS medium for the demonstration of this concept was simply a 15 cm long block of fused silica with its end faces polished approximately parallel and anti-reflection coated for a wavelength of 1 $\mu$m. A quarter-waveplate placed at the input to the conjugator served two purposes. The first was to provide a 90° polarization rotation of the reflected light, allowing it to be optically isolated from the input by a polarizing beamsplitter. The second was to introduce circular polarization in order to lower the nonlinear gain for self-focusing in the fused silica. It is well known that, for fused silica, the nonlinear index is significantly higher for linear polarization than for circular polarization. Using 15 ns input pulses generated by a 1.053 $\mu$m Nd:YLF laser, an energy reflectivity of >80% was demonstrated. As shown in FIG. 9, the measured threshold energy was approximately 2.5 mJ and a maximum slope efficiency of 90% was reached.

Many thousands of laser shots were directed into the phase conjugator with no measurable damage. When the beam was blocked between the glass block and the second lens, the system became a simple, single focus SBS mirror. In this case, abrupt and catastrophic damage was seen to occur above input energies of 30–40 mJ. This was evidenced by the termination of Stokes output, bright flashes at focus, and elongated damage tracks in the material.

Fused silica is not the only, nor possibly the best, solid state material for the SBS medium in every application. Gains as high as 25 cm/GW have been measured in the crystal DLAP which exceed that for fused silica by 4–5 times. This enables energy thresholds of well below 1 mJ. Any solid state material that exhibits an adequate electrostrictive effect giving rise to SBS gain can be usefully employed in the optical architecture of this invention. However, fused silica remains an attractive candidate material for its ready supply, straightforward fabrication and optical coating, and very low linear absorption coefficient.

The high average power laser systems described above can operate at the higher repetition rate through the use of a laser diode pumping system. Laser diodes generate less heat and thus allow for higher average power output from the laser; however, the cost of laser diodes may be prohibitive.

Changes and modifications in the specifically described embodiments can be carried out without departing from the scope of the invention, which is intended to be limited by the scope of the appended claims.

The invention claimed is:

1. A method for laser shock processing a workpiece, comprising:
    providing at least one laser pulse from a wavefront corrected laser system having (i) an oscillator with a near field image plane, (ii) a multipass amplifier with a mid-plane and (iii) at least one internal stimulated Brillouin scattering phase conjugator with an input plane;
    controlling the wavefront of said at least one laser pulse by optically relaying said near field image plane to about said mid-plane and relaying about said midplane to about said input plane;
    tailoring the intensity distribution of said at least one laser pulse to produce a tailored laser pulse; and
    directing said tailored laser pulse onto a workpiece.
2. The method of claim 1, further comprising relaying the image plane from the near field output of said at least one laser pulse to said workpiece without allowing said at least one laser pulse to go through a focus.
3. A method for laser shock processing a workpiece, comprising:
    providing at least one laser pulse from a wavefront corrected laser system having (i) an oscillator with a near field image plane, (ii) a multipass amplifier positioned at a relayed image mid-plane and (iii) at least one internal stimulated Brillouin scattering phase conjugator with an input plane;

controlling the wavefront of said at least one laser pulse by optically relaying said near field image plane to about said mid-plane and relaying about said midplane to about said input plane;

tailoring the intensity distribution of said at least one laser pulse to produce a tailored laser pulse;

directing said tailored laser pulse onto a workpiece, wherein said image plane is relayed to said workpiece without allowing said at least one laser pulse to go through a focus; and creating a virtual source from said near field output of said at least one laser pulse and imaging said virtual source onto said workpiece as a real image.

4. The method of claim 3, wherein said virtual source is created by passing said first laser pulse through a negative lens.

5. The method of claim 4, wherein said virtual source is relayed to said workpiece by passing the output of said negative lens through two positive lenses.

6. The method of claim 1, wherein said at least one laser pulse comprises a single transverse mode, wherein said at least one laser pulse is tailored in spatial profile and intensity distribution by transmitting the image plane from the near field output of said at least one laser pulse through a diffractive optic and passing said image plane through a positive lens.

7. The method of claim 1, wherein said at least one laser pulse comprises a single transverse mode, wherein said at least one laser pulse is tailored in spatial profile and intensity distribution by reflecting the image plane from the near field output of said at least one laser pulse from a diffractive optic and passing said image plane through a positive lens.

8. The method of claim 6, wherein said diffractive optic varies the optical path for said image plane transmitted through said diffractive optic in a defined and repeated pattern across the spatial profile of said at least one laser pulse.

9. The method of claim 7, wherein said diffractive optic varies the optical path for said image plane reflected from said diffractive optic in a defined and repeated pattern across the spatial profile of said at least one laser pulse.

10. The method of claim 1, wherein said at least one internal stimulated Brillouin scattering phase conjugator comprises a solid-state Stimulated Brillouin Scattering (SBS) phase conjugate mirror.

11. The method of claim 10, wherein said solid-state Stimulated Brillouin Scattering (SBS) phase conjugate mirror comprises a pair of high reflectors having their mirrored surfaces facing each other; a confocal lens pair placed between said pair of high reflectors, wherein said confocal lens pair together with said pair of high reflectors form a doubly resonant configuration incorporating at least five foci distributed in two overlapping regions; and a solid-state SBS gain medium placed between said confocal lens pair.

12. The method of claim 11, wherein said confocal lens pair together with said pair of high reflectors form a doubly resonant configuration incorporating at least 7 foci distributed in two overlapping regions.

13. The method of claim 11, wherein said laser system comprises an oscillator and at least one multi-pass amplifier, wherein said at least one laser pulse passes through at least one amplifier pass through said at least one multi-pass amplifier, wherein SBS phase conjugate mirror is placed within said laser system at the midpoint of the total number of amplifier passes.

14. The method of claim 1, wherein said SBS phase conjugator comprises an oscillator cell and an amplifier cell, each filled with liquid selected from a group consisting of $CCl_4$ and Freon, wherein each cell comprises transparent windows suitable for transmitting the partially amplified beam into the cells for phase conjugated reflection in which the leading edge of the pulse is sharpened by the thresholding and fast response time of the SBS process.

15. An apparatus for laser shock processing a workpiece, comprising:

a wavefront corrected laser system for providing at least one laser pulse, wherein said laser system includes (i) an oscillator with a near field image plane, (ii) a multipass amplifier with a mid-plane and (iii) at least one internal stimulated Brillouin scattering phase conjugator with an input plane;

controlling the wavefront of said at least one laser pulse by optically relaying said near field image plane to about said mid-plane and relaying about said midplane to about said input plane;

means for tailoring the intensity distribution of said at least one laser pulse to produce a tailored laser pulse; and means for directing said tailored laser pulse onto a workpiece.

16. An apparatus for laser shock processing a workpiece, comprising:

a wavefront corrected laser system for providing at least one laser pulse, wherein said laser system includes having (i) an oscillator with a near field image plane, (ii) a multipass amplifier with a mid-plane and (iii) at least one internal stimulated Brillouin scattering phase conjugator with an input plane;

controlling the wavefront of said at least one laser pulse by optically relaying said near field image plane to about said mid-plane and relaying about said midplane to about said input plane;

means for tailoring the intensity distribution of said at least one laser pulse to produce a tailored laser pulse;

means for directing said tailored laser pulse onto a workpiece; and means for relaying the image plane from the near field output of said at least one laser pulse to said workpiece without allowing said at least one laser pulse to go through a focus.

17. The apparatus of claim 16, further comprising means for creating a virtual source from said near field output of said at least one laser pulse and using a plurality of lenses, relaying said virtual source to said workpiece without going through a focus.

18. The apparatus of claim 17, wherein said means for creating a virtual source from said near field output of said at least one laser pulse comprises a negative lens.

19. The apparatus of claim 18, wherein said means for relaying the image plane from the near field output of said at least one laser pulse to said workpiece without allowing said at least one laser pulse to go through a focus further comprises two positive lenses.

20. The apparatus of claim 15, wherein said at least one laser pulse comprises a single transverse mode, wherein said means for tailoring the intensity distribution and spatial profile of said at least one laser pulse comprises a diffractive optic and a positive lens, wherein said at least one laser pulse is tailored in spatial profile and intensity distribution by transmitting the image plane from the near field output of said at least one laser pulse through said diffractive optic and passing said image plane through said positive lens.

21. The apparatus of claim 15, wherein said at least one laser pulse comprises a single transverse mode, wherein said means for tailoring the intensity distribution and spatial profile of said at least one laser pulse comprises a diffractive optic and a positive lens, wherein said at least one laser pulse is tailored in spatial profile and intensity distribution by reflecting the image plane from the near field output of said at least one laser pulse from said diffractive optic and passing said image plane through said positive lens.

22. The apparatus of claim 20, wherein said diffractive optic varies the optical path for said image plane transmitted through said diffractive optic in a defined and repeated pattern across the spatial profile of said at least one laser pulse.

23. The apparatus of claim 21, wherein said diffractive optic varies the optical path for said image plane reflected from said diffractive optic in a defined and repeated pattern across the spatial profile of said at least one laser pulse.

24. The apparatus of claim 15, wherein said at least one internal stimulated Brillouin scattering phase conjugator comprises a solid-state Stimulated Brillouin Scattering (SBS) phase conjugate mirror.

25. The apparatus of claim 24, wherein said solid-state Stimulated Brillouin Scattering (SBS) phase conjugate mirror comprises a pair of high reflectors having their mirrored surfaces facing each other; a confocal lens pair placed between said pair of high reflectors, wherein said confocal lens pair together with said pair of high reflectors form a doubly resonant configuration incorporating at least five foci distributed in two overlapping regions; and a solid-state SBS gain medium placed between said confocal lens pair.

26. The apparatus of claim 25, wherein said confocal lens pair together with said pair of high reflectors form a doubly resonant configuration incorporating at least 7 foci distributed in two overlapping regions.

27. The apparatus of claim 15, wherein said SBS phase conjugator comprises an oscillator cell and an amplifier cell, each filled with liquid selected from a group consisting of $CCl_4$ and Freon, wherein each cell comprises transparent windows suitable for transmitting the partially amplified beam into the cells for phase conjugated reflection in which the leading edge of the pulse is sharpened by the thresholding and fast response time of the SBS process.

* * * * *